Dec. 20, 1960 E. A. MORLAN 2,965,184
IMPROVED CONE-TYPE BIT
Filed Nov. 1, 1957
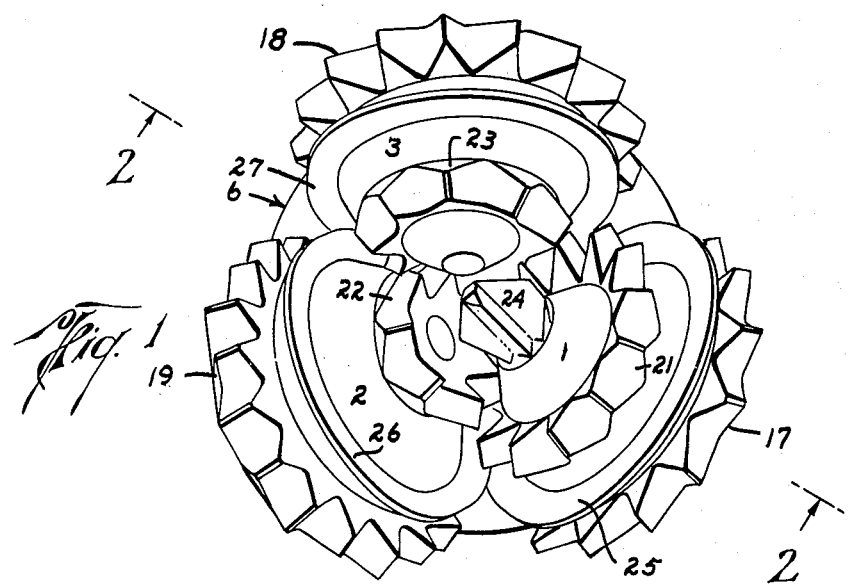
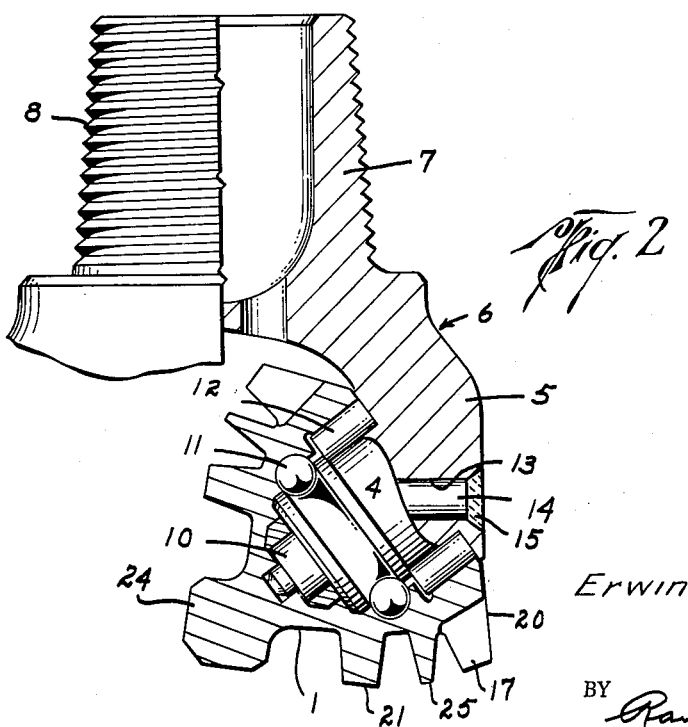
Erwin A. Morlan
INVENTOR.
BY Ray L. Smith
ATTORNEY

United States Patent Office 2,965,184
Patented Dec. 20, 1960

2,965,184

IMPROVED CONE-TYPE BIT

Erwin A. Morlan, Houston, Tex., assignor to Hughes Tool Company, Houston, Tex., a corporation of Delaware Filed Nov. 1, 1957, Ser. No. 693,987

3 Claims. (Cl. 175—356)

This invention relates to earth boring drills or bits and more particularly to cone type bits which utilize a plurality of rolling cutters having generally conical peripheral surfaces provided with rows of suitable cutting elements thereon.

Conventional bits of the cone type utilize a plurality of generally conical cutters with spaced rows of teeth or other suitable cutting elements thereon. The rows on the respective cutters are so arranged that they cooperatively disintegrate the entire bottom of a hole being drilled. Also, usually the outermost row or series of cutting elements on all of the cones extends to the cylindrical wall of the bore and serve to maintain gage thereof as well as to cut bottom at and proximate the wall. Such a bit is quite effective in serving its intended purposes but certain difficulties are experienced in some formations and other difficulties are experienced in other types of formations. For example, in some formations such as soft or medium hard formations or where light weight is applied to minimize drilling of crooked hole, off center running of the bit will take place. That is to say, the bit will gyrate about the axis of the hole being drilled thus cutting an enlarged hole and at the same time reducing the efficiency of drilling and increasing the destructive effect upon the bit. Also, in many formations extremely rough running of the bit will occur thus placing undue strains upon the bit, its bearing and other drilling equipment such as drill collars, drill pipe, tool joints and even driving equipment at the surface. A contributing factor may be tracking of cutting elements on bottom which causes upstanding teeth of the formation to form. This condition may progress to a point at which the cutter shell rides upon the upstanding teeth and further progress is greatly reduced or may be terminated.

The primary object is to provide a bit which reduces, and in some formations and drilling conditions completely overcomes, these difficulties.

Another object is to provide a bit which is smooth running.

Still another object is to provide a bit which presents an increased cutting structure on bottom in proportion to the amount of formation material being removed.

A further object is to provide a bit with series of conventional cutting structures on the cutters, and complementing and cooperating circumferentially extending cutting elements to disintegrate a portion of the bottom of the hole and stabilize the bit.

A still further object is to so orient the respective cutting elements that they have an interfitting relationship whereby maximum utility is had of space available for the cutter assemblies including cutter shaft, bearings, cutter shell and cutting elements.

Another and more specific object is to provide a cone type bit in which series of cutter teeth are arranged on the conical cutters to move in interfitting relation and to disintegrate a portion of the bottom of the hole, a continuous circumferentially extending cutting element being provided on at least some of the cutters to disintegrate the remaining portion of the bottom of the hole and said continuous cutting elements having an interfitting relation relative to each other and the series of teeth.

These and other objects and advantages of the invention will be more fully apparent from the following description and the drawings in which:

Fig. 1 is a bottom plan view of a three cone bit embodying the invention.

Fig. 2 is an elevational view of the bit embodying the invention, portions of the structure being cut away in order to more clearly show structure, the view being taken on line 2—2 of Fig. 1.

While the invention is shown, and hereinafter described as applied to a three-cutter bit, it is to be understood it is not confined thereto but is applicable to any multi-cutter cone type bit. The conical cutters 1, 2, and 3 are mounted upon and completely enclose the free ends of cantilever shafts 4 which extend inwardly and downwardly from legs 5 of bit head 6 which terminates at its upper end in hollow pin 7 threaded peripherally at 8 for attachment to the lower end of an actuating drill string.

The bearing between the cutters and their respective associated shafts 4 comprises a stepped pilot pin 10 having frictional engagement with the surrounding complemental stepped bore, a ball bearing 11 in complemental races intermediate the ends of the shaft 4 and the cutter, and a roller bearing 12 outwardly therefrom at the base of the shaft and heel of the cone. The ball bearing 11 serves to carry both radial load and axial thrust upon the cutter thereby holding the cutter in position axially of the shaft. The balls are inserted into their raceways by way of a bore 13 through the leg 5 and into the ball raceway in the shaft 4. When they are in place the bore is closed by a plug 14 which is held in place by a deposit of weld metal 15. Inasmuch as the bearing structure is relatively conventional only a general description thereof is given herein.

It is to be noted that cutting elements on the cone cutters comprise rows of teeth of which the outermost or heel rows 17, 18, 19 of all the cutters move in a common path to cut bottom at and proximate the wall of the bore and to maintain gage by virtue of the gage cutting surface 20 thereon. Inner rows of teeth 21, 22, and 23 are spaced from the heel rows progressively inwardly toward the axis of the bit and cut bottom proximate the axis of the bore, the spearpoint 24 on cone 1 serving to disintegrate bottom at the center of the hole.

Between the path cut by the rows of heel teeth 17, 18, and 19 and the next adjacent path cut by the teeth 21 on cone 1 there are provided annular cutting elements 25, 26, and 27 in staggered relation so that their concentric paths are such that the path on bottom cut thereby complements the paths cut by the series of teeth as above described and the entire bottom of the hole is disintegrated effectively.

Since the rows of teeth 21, 22, 23 are staggered along the surface of the cutters and the annular cutting elements 25, 26, and 27 are likewise staggered it seems apparent that all cutting elements inwardly from the heel rows 17, 18, and 19 have an interfitting but noninterfering relation whereby these cutting elements may be extremely long and yet clear the surface of the cutter shells of the next adjacent cutters. Thus a relatively large volume of metal is available for wearing away before the bit has terminated its useful life. Furthermore the interfitting relationship provides a self-cleaning action as the cutting elements of adjacent cutters pass moving in opposite directions while in operation.

It is to be understood that the number of teeth in the various series and especially in the heel rows 17, 18, 19 shall vary in any suitable manner and will preferably differ on the different cutters. This will assist in preventing the formation of upstanding teeth on the bottom of the hole being drilled. It would appear that the annular cutting elements or ridges 25, 26, 27 not only cut the annular portion of bottom between the path of the heel teeth 17, 18, 19 and the next inward row of teeth 21 but also tend to stabilize the action of the bit on bottom. That is, these cutting elements assist in preventing the stumbling of teeth into depressions on bottom and hence contributing to the prevention of the building up of upstanding teeth on bottom. They also appear to contribute to a smoother running bit and to require the bit to rotate concentric of the bore, this avoiding gyratory or eccentric action with attendant difficulties as above pointed out.

Broadly the invention provides an earth boring drill or bit which is capable of smooth and efficient action and of producing large footage per bit.

The invention claimed is:

1. A well drill head including, a head, a plurality of cutters of approximately conical shape mounted for independent rotation on the lower end thereof, circumferential rows of teeth in spaced relation along each of the cutters, the outermost rows of teeth on the cutters being arranged to cut an annular area at and proximate the wall of a bore being formed by the drill, the innermost rows of teeth on the cutters being spaced inwardly from said outermost rows and arranged to cut a circular area at and proximate the axis of a bore being formed, and an annular, continuous, circumferential cutting element on at least one of said cutters intermediate the innermost and outermost rows of teeth, said annular cutting element being arranged to cut an annular track about the axis of rotation of the drill and to cooperate with said rows of teeth to disintegrate the entire bottom of the bore being formed by the drill.

2. A well drill head including, a head, a plurality of cutters of approximately conical shape mounted for independent rotation on the lower end thereof, circumferential rows of teeth in spaced relation along each of the cutters, the outermost rows of teeth on the cutters being arranged to cut an annular area at and proximate the wall of a bore being formed by the drill, the innermost rows of teeth on the cutters being spaced inwardly from said outermost rows and arranged to cut a circular area at and proximate the axis of a bore being formed, and an annular, continuous circumferential cutting element on at least two of said cutters intermediate the innermost and outermost rows of teeth thereon, said annular cutting elements being arranged in staggered relation radially of the drill to cut separate concentric tracks on the well bottom and to thereby disintegrate the portion of the well bottom uncut by the innermost and outermost rows of teeth on the cutters.

3. A well drill head including, a head, a plurality of cutters of approximately conical shape mounted for independent rotation on the lower end thereof, circumferential rows of teeth in spaced relation along each of the cutters, the outermost rows of teeth on the cutters being arranged to cut an annular area at and proximate the wall of a bore being formed by the drill, the innermost rows of teeth on the cutters being spaced inwardly from said outermost rows and arranged to cut a circular area at and proximate the axis of a bore being formed, and an annular, continuous circumferential cutting element on each of said cutters inwardly from the outermost row of teeth thereon, said annular cutting elements being arranged in staggered relation radially of the drill to cut separate concentric tracks on the well bottom and thereby disintegrate the portion of the well bottom uncut by the innermost and outermost rows of teeth on the cutters.

References Cited in the file of this patent

UNITED STATES PATENTS

| | | |
|---|---|---|
| 2,310,289 | Hokanson | Feb. 9, 1943 |
| 2,533,257 | Woods et al. | Dec. 12, 1950 |